United States Patent
Shin et al.

(10) Patent No.: US 11,492,481 B2
(45) Date of Patent: Nov. 8, 2022

(54) THERMOPLASTIC RESIN COMPOSITION INCLUDING MALEIMIDE-BASED HEAT-RESISTANT COPOLYMER AND MOLDED PRODUCT USING SAME

(71) Applicant: LOTTE CHEMICAL CORPORATION, Seoul (KR)

(72) Inventors: Hyeongseob Shin, Uiwang-si (KR); Keehae Kwon, Uiwang-si (KR); Younghyo Kim, Uiwang-si (KR); In-Chol Kim, Uiwang-si (KR); Jieun Park, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 192 days.

(21) Appl. No.: 16/958,798

(22) PCT Filed: Dec. 7, 2018

(86) PCT No.: PCT/KR2018/015497
§ 371 (c)(1),
(2) Date: Jun. 29, 2020

(87) PCT Pub. No.: WO2019/132304
PCT Pub. Date: Jul. 4, 2019

(65) Prior Publication Data
US 2021/0061984 A1 Mar. 4, 2021

(30) Foreign Application Priority Data

Dec. 29, 2017 (KR) .................. 10-2017-0184921
Dec. 4, 2018 (KR) .................. 10-2018-0154655

(51) Int. Cl.
*C08L 33/12* (2006.01)
*C08L 51/00* (2006.01)
*C08L 25/08* (2006.01)
*C08L 39/04* (2006.01)

(52) U.S. Cl.
CPC .............. *C08L 33/12* (2013.01); *C08L 39/04* (2013.01); *C08L 51/003* (2013.01); *C08L 2201/08* (2013.01)

(58) Field of Classification Search
None
See application file for complete search history.

(56) References Cited

U.S. PATENT DOCUMENTS

| | | | | |
|---|---|---|---|---|
| 3,793,402 A * | 2/1974 | Owens | ..................... | C08L 33/10 525/902 |
| 4,579,909 A * | 4/1986 | Giles, Jr. | ................. | C08L 25/14 525/146 |
| 5,328,962 A * | 7/1994 | Shen | ...................... | C08L 33/12 525/308 |
| 6,277,913 B1 * | 8/2001 | Mishima | ................ | C08L 55/02 525/227 |
| 2007/0047638 A1 | 3/2007 | Lam et al. | | |
| 2007/0203293 A1 | 8/2007 | Ahn et al. | | |
| 2014/0322487 A1 | 10/2014 | Choi et al. | | |
| 2017/0088704 A1 | 3/2017 | Park | | |
| 2017/0121519 A1 | 5/2017 | Park et al. | | |
| 2017/0260382 A1 | 9/2017 | Lee et al. | | |

FOREIGN PATENT DOCUMENTS

| | | |
|---|---|---|
| JP | 2004-323772 A | 11/2004 |
| KR | 10-0171619 B1 | 6/1994 |
| KR | 10-2001-0062986 A | 7/2001 |
| KR | 10-2007-0027775 A | 3/2007 |
| KR | 10-2015-0067743 A | 6/2015 |
| KR | 10-2015-0067746 A | 6/2015 |
| KR | 10-2015-0114239 A | 10/2015 |
| KR | 10-2016-0141432 A | 12/2016 |
| KR | 10-2017-0039048 A | 4/2017 |
| KR | 10-2016-0061628 A | 7/2017 |
| WO | 2019/132304 A2 | 7/2019 |

OTHER PUBLICATIONS

Tsimpris; Intrinsic Viscosity-Molecular Weight Relationship for Polystyrene in Dimethylformamide; Journal of Polymer Science Part A-2 vol. 10 pp. 1837-1839. (Year: 1972).*
International Search Report in counterpart International Application No. PCT/KR2018/015497 dated Jun. 19, 2019, pp. 1-6.
Search Report in counterpart European Application No. 18897181.6 dated Sep. 23, 2021, pp. 1-7.

* cited by examiner

*Primary Examiner* — David J Buttner
(74) *Attorney, Agent, or Firm* — Additon, Pendleton & Witherspoon, P.A.

(57) ABSTRACT

This disclosure relates to a thermoplastic resin composition comprising (A) 60 to 85 wt % of a (meth)acrylic resin, (B) 10 to 30 wt % of an acrylic graft copolymer, and (C) 5 to 10 wt % of a maleimide-based heat-resistant copolymer and a molded product using the same.

13 Claims, No Drawings

THERMOPLASTIC RESIN COMPOSITION INCLUDING MALEIMIDE-BASED HEAT-RESISTANT COPOLYMER AND MOLDED PRODUCT USING SAME

CROSS-REFERENCE TO RELATED APPLICATIONS

This application claims priority to and the benefit of International Application No. PCT/KR2018/015497, filed Dec. 7, 2018, which published as WO 2019/132304 on Jul. 4, 2019; Korean Patent Application No. 10-2017-0184921, filed in the Korean Intellectual Property Office on Dec. 29, 2017; and Korean Patent Application No. 10-2018-0154655, filed in the Korean Intellectual Property Office on Dec. 4, 2018, the entire disclosure of each of which is incorporated herein by reference.

TECHNICAL FIELD

The present invention relates to a thermoplastic resin composition and a molded product using the same.

BACKGROUND ART

According to an environmentally-friendly trend, a demand for unpainted materials for automobile exterior materials has been increased. Accordingly, as the unpainted materials are increasingly required of higher heat resistance, development of an acrylonitrile-styrene-acrylate copolymer (ASA)/poly(methyl methacrylate) (PMMA) alloy material having excellent coloring properties and heat resistance is being made.

However, compared with an acrylonitrile-styrene-acrylate copolymer, which is conventionally used as an exterior material, a poly(methyl methacrylate) material has a low impact strength and heat resistance, and in order to compensate for these, a heat-resistance reinforcing agent, and the like may be applied thereto, but a refractive index difference of the heat-resistance reinforcing agent from the acrylonitrile-styrene-acrylate copolymer (ASA) and the poly(methyl methacrylate) (PMMA) may occur and deteriorate transparency, which leads to decrease of coloring properties and results in using a large amount of colorant.

Accordingly, research on a thermoplastic resin composition having excellent heat resistance and coloring properties is required.

DISCLOSURE

DESCRIPTION OF THE DRAWINGS

Technical Problem

The present invention is to provide a thermoplastic resin composition capable of realizing excellent impact resistance properties, coloring properties, and heat resistance, and a molded product using the same.

Technical Solution

According to an embodiment, provided is a thermoplastic resin composition comprising (A) 60 to 85 wt % of a (meth)acrylic resin, (B) 10 to 30 wt % of an acrylic graft copolymer, and (C) 5 to 10 wt % of a maleimide-based heat-resistant copolymer.

Another embodiment provides a molded product using the aforementioned thermoplastic resin composition.

Advantageous Effects

The thermoplastic resin composition according to an embodiment enables to produce a molded product having improved impact resistance, coloring properties, and heat resistance.

Mode for Invention

Hereinafter, embodiments of the present invention will be described in detail. In the following description of the present disclosure, the well-known functions or constructions will not be described in order to clarify the present disclosure.

A thermoplastic resin composition according to an embodiment of the present invention may comprise (A) 60 to 85 wt % of a (meth)acrylic resin, (B) 10 to 30 wt % of an acrylic graft copolymer, and (C) 5 to 10 wt % of a maleimide-based heat-resistant copolymer.

(A) (Meth)acrylic Resin

The (meth)acrylic resin (A) has improved coloring properties so that the thermoplastic resin composition according to an embodiment may be applied to the unpainted material.

In addition, the (meth)acrylic resin (A) has a glass transition temperature (Tg) of greater than or equal to about 110° C., thereby improving heat resistance of the thermoplastic resin composition. The glass transition temperature of the (meth)acrylic resin (A) may be for example 110° C. to 130° C., for example, 110° C. to 125° C., for example, 115° C. to 125° C. Within the range, flowability of the thermoplastic resin composition and compatibility with other components may be increased, and a stress applied during the process may be lowered, and heat resistance and coloring properties of the thermoplastic resin composition may be improved.

The (meth)acrylic resin (A) may have a weight average molecular weight of 50,000 to 300,000 g/mol. For example, the (meth)acrylic resin (A) may have a weight average molecular weight of 70,000 to 250,000 g/mol, for example, 100,000 to 200,000 g/mol. Within the range, compatibility with other components is improved and flowability and molding processability of the thermoplastic resin composition are improved.

The (meth)acrylic resin (A) may be a polymer of (meth)acrylate monomers including a C1 to C10 alkyl group. When the (meth)acrylic resin (A) is a polymer of (meth)acrylate monomers, compatibility with other components, flowability of the thermoplastic resin composition, and molding processability may be further improved.

The (meth)acrylic resin (A) may be, for example, a polymer of one or more than one of (meth)acrylate monomers selected from methyl acrylate, ethyl acrylate, butyl acrylate, 2-ethylbutyl acrylate, 2-ethylhexyl acrylate, hexyl acrylate, heptyl acrylate, octyl acrylate, n-pentyl acrylate, vinyl acrylate, lauryl acrylate, methyl methacrylate, ethyl methacrylate, butyl methacrylate, 2-ethylbutyl methacrylate, 2-ethylhexyl methacrylate, and lauryl methacrylate.

For example, the (meth)acrylic resin (A) may be poly (methyl methacrylate) (PMMA).

The (meth)acrylic resin (A) may be prepared by using the monomers along with a solvent and a polymerization initiator in a common bulk, emulsion, or suspension polymerization method, but not limited thereto. Herein, the solvent includes methanol, tetrahydrofuran, ethylene glycol monomethyl ether, ethylene glycol monoethyl ether, propylene glycol monomethyl ether acetate, methyl cellosolve acetate, ethyl cellosolve acetate, ethers such as ethylene glycol monoethyl ether and diethylene glycol monomethyl ether, and a combination thereof. In addition, the polymerization initiators includes 2,2'-azobisisobutyronitrile, 2,2'-azobis(2,4-dimethylvaleronitrile), 2,2'-azobis(4-methoxy 2,4-dimethylvaleronitrile), and the like.

The (meth)acrylic resin (A) may be included in an amount of 60 to 85 wt % based on a total weight of the components (A) to (C). Within the range, the thermoplastic resin composition according to an embodiment may exhibit excellent property balance of flowability, impact resistance, and heat resistance, and in addition, the heat resistance and coloring properties thereof are improved.

(B) Acrylic Graft Copolymer

The acrylic graft copolymer (B) may be prepared by graft polymerization of a monomer mixture comprising an aromatic vinyl compound and a vinyl cyanide compound on an acrylic rubbery polymer.

The polymerization may include commonly-used manufacturing methods, for example, an emulsion polymerization, a suspension polymerization, a solution polymerization, a bulk polymerization, or the like.

The acrylic rubbery polymer may be an alkyl acrylate-based rubber, and desirably a C2 to C10 alkyl acrylate rubber. For example, a butyl acrylate rubber, an 2-ethylhexyl acrylate rubber, and a mixture thereof may be used, but it is not limited thereto.

The acrylic rubbery polymer may be included in 40 wt % to 65 wt % (a solid content) based on a total weight of the acrylic graft copolymer (B). Herein, the acrylic rubbery polymer may have an average particle diameter of 150 to 400 nm. For example, the acrylic rubbery polymer may have an average particle diameter of 150 to 400 nm, for example, 200 to 400 nm, for example 300 to 400 nm.

The average particle diameter refers to a volume average diameter, and refers to a Z-average particle diameter measured using a dynamic light scattering analyzer.

The copolymer of the aromatic vinyl compound and the vinyl cyanide compound graft-polymerized on the rubbery polymer may be prepared in a weight ratio of 6:4 to 8:2 between the aromatic vinyl compound and the vinyl cyanide compound.

The aromatic vinyl compound may include styrene, a-methyl styrene, p-methyl styrene, p-t-butyl styrene, 2,4-dimethyl styrene, chlorostyrene, vinyl toluene, vinyl naphthalene, etc., which may be used alone or in combination. Among them, in an embodiment, styrene may be desirable.

Examples of the vinyl cyanide compound include acrylonitrile, methacrylonitrile, and fumaronitrile, which may be used alone or in combination. Among these, in an embodiment, acrylonitrile may be desirably used.

The acrylic graft copolymer (B) may be, for example, an acrylonitrile-styrene-acrylate graft copolymer (g-ASA).

The acrylonitrile-styrene-acrylate graft copolymer may be prepared by adding acrylonitrile and styrene to the alkyl acrylate-based rubber through their graft-copolymerization reaction on the alkyl acrylate-based rubber.

The acrylic graft copolymer (B) may be included in an amount of 10 to 30 wt % based on a total weight of the components (A) to (C). Within the range, impact resistance, heat resistance, and coloring properties of the thermoplastic resin composition according to an embodiment may be improved.

(C) Maleimide-based Heat-resistant Copolymer

The thermoplastic resin composition may comprise (C) a maleimide-based heat-resistant copolymer. The maleimide-based heat-resistant copolymer (C) may be, for example, an N-phenyl maleimide (PMI)-based copolymer. The maleimide-based heat-resistant copolymer (C) may be added to further improve heat resistance of the thermoplastic resin composition.

The maleimide-based heat-resistant copolymer (C) may be a terpolymer of N-phenyl maleimide, styrene, and maleic anhydride. When a component derived from N-phenyl maleimide is included, heat resistance of the thermoplastic resin composition may be more improved, and when components derived from styrene and maleic anhydride are included, coloring properties of the thermoplastic resin composition may be improved.

According to an embodiment, the ternary copolymer of N-phenyl maleimide, maleic anhydride, and styrene may be prepared through an imidization reaction of a copolymer of styrene and maleic anhydride, and the maleimide-based heat-resistant copolymer (C) may be a copolymer of 15 to 25 wt % of a component derived from the N-phenyl maleimide, 65 to 75 wt % of a component derived from the styrene, and 5 to 10 wt % of a component derived from the maleic anhydride based on a total weight of the maleimide-based heat-resistant copolymer. Within the above ranges, heat resistance of the thermoplastic resin composition may be evenly improved, and a decrease of coloring properties may be minimized.

The glass transition temperature (Tg) of the maleimide-based heat-resistant copolymer (C) may be 150° C. to 220° C. For example, the glass transition temperature (Tg) of the maleimide-based heat-resistant copolymer (C) may be 160° C. to 200° C., for example 180° C. to 200° C.

The weight average molecular weight of the maleimide-based heat-resistant copolymer (C) may be 80,000 to 200,000 g/mol. For example, the weight average molecular weight of the maleimide-based heat-resistant copolymer (C) may be 100,000 to 180,000 g/mol, for example, 130,000 to 160,000 g/mol.

The maleimide-based heat-resistant copolymer (C) has an advantage of exhibiting improved heat resistance and coloring properties in the ranges of the glass transition temperature and weight average molecular weight, and also has good extrusion processability and flowability.

The maleimide-based heat-resistant copolymer (C) may be included in an amount of 5 to 10 wt % based on a total weight of the components (A) to (C). When the maleimide-based heat-resistant copolymer (C) is included in the above range, heat resistance and coloring properties of the thermoplastic resin composition may be evenly improved.

(D) Other Additives

The thermoplastic resin composition may further comprise one or more types of other additives in order to balance properties, or as needs of final uses. Specifically, the other additives may be flame retardants, surfactants, nucleating agents, coupling agents, fillers, plasticizers, impact-reinforcing agents, lubricants, antibacterial agents, release agents, antioxidants, inorganic material additives, colorants, lubricants, antistatic agents, pigments, dyes, flame-proofing agents, heat stabilizers, ultraviolet (UV) stabilizers, ultraviolet (UV) blocking agents, adhesives, and the like, and may be used alone or in a combination of two or more.

The other additives may be appropriately included within a range that does not impair the physical properties of the thermoplastic resin composition, and may be specifically included in an amount of less than or equal to 50 parts by weight, and more specifically 0.1 parts by weight to 30 parts by weight based on 100 parts by weight of the (A) to (C) components.

The aforementioned thermoplastic resin composition may be produced by a known production method. For example, other components according to an embodiment and other additives are simultaneously mixed, and the mixture is melt-kneaded in an extruder and produced as a pellet type.

Hereinafter, the present invention is illustrated in more detail with reference to examples and comparative examples. However, the following examples and comparative examples are provided for the purpose of descriptions and the present invention is not limited thereto.

Hereinafter, the present invention is illustrated in more detail with reference to examples. These examples, however, are not in any sense to be interpreted as limiting the scope of the invention.

EXAMPLES 1 TO 5 AND COMPARATIVE EXAMPLES 1 TO 8

The thermoplastic resin compositions of Examples 1 to 5 and Comparative Examples 1 to 8 were prepared according to the component content ratios shown in Table 1.

In Table 1, the components (A), (B), and (C) of the thermoplastic resin composition are expressed as wt % based on a total weight of the components (A) to (C).

Equally based on 100 parts by weight of the components (A) to (C) described in Table 1, 0.3 parts by weight of a hindered phenol-based heat stabilizer, 0.02 parts by weight of a silicon-based impact-reinforcing agent, and 0.8 parts by weight of an HALS-based ultraviolet (UV) stabilizer as other additives were respectively added thereto and then, melted/kneaded to prepare pellets. A twin-screw extruder having L/D=29 and a diameter of 45 mm was used for extrusion, and a barrel temperature was set at 230° C.

The manufactured pellets were dried at 80° C. for 4 hours and molded into a size of 100 mm×100 mm×3.2 mm to obtain specimens for measuring properties. Herein, a 6 oz injection molding machine was used, and a cylinder temperature was set at 220° C., and a mold temperature was set at 60° C.

TABLE 1

|  |  | Examples | | | | | Comparative Examples | | | | | | | |
|---|---|---|---|---|---|---|---|---|---|---|---|---|---|---|
|  |  | 1 | 2 | 3 | 4 | 5 | 1 | 2 | 3 | 4 | 5 | 6 | 7 | 8 |
| (A) (Meth)acrylic resin | PMMA | 65 | 64 | 63 | 62 | 61 | 70 | 68 | 66 | 64 | 62 | 68 | 60 | 58 |
| (B) Acrylic graft copolymer | g-ASA | 30 | 30 | 30 | 30 | 30 | 30 | 30 | 30 | 30 | 30 | 30 | 30 | 30 |
| (C) Maleimide-based heat-resistant copolymer | PMI-MAH-SM (C) | 5 | 6 | 7 | 8 | 9 | — | — | — | — | — | 2 | 10 | 12 |
|  | PMI-MAH-SM (C') | — | — | — | — | — | 2 | 4 | 6 | 8 | — | — | — |

Each composition shown in Table 1 is illustrated as follows.

(A) Poly(Methyl Methacrylate) Resin (Manufacturer: Arkema, Tradename: V40)

A poly(methyl methacrylate) (PMMA) resin having a glass transition temperature of about 120° C. and a weight average molecular weight of about 100,000 g/mol was used.

(B) Acrylonitrile-Styrene-Acrylate Draft Copolymer (Manufacturer: Lotte Advanced Materials Co., Ltd.)

An acrylonitrile-styrene-acrylate graft copolymer (g-ASA) comprising about 60 wt % of a butyl acrylate rubber having an average particle diameter of about 300 nm, wherein a copolymer of styrene and acrylonitrile in a weight ratio of about 7:3 was copolymerized with the butyl acrylate rubber, was used.

(C) N-Phenyl Maleim Ide-Maleic Anhydride-Styrene Copolymer (Manufacturer: Polyscope, Tradename: IZ0721M)

An N-phenyl maleimide-maleic anhydride-styrene (PMI-MAH-SM) copolymer having a weight average molecular weight of about 150,000 g/mol and a glass transition temperature of about 177° C. was used. The copolymer included about 21 wt % of a component derived from N-phenyl maleimide, about 7 wt % of a component derived from maleic anhydride, and about 72 wt % of a component derived from styrene.

(C') N-Phenyl Maleimide-Maleic Anhydride-Styrene Copolymer (Manufacturer: Denka, Tradename: MS-NB)

An N-phenylmaleim ide-maleic anhydride-styrene (PMI-MAH-SM) copolymer having a weight average molecular weight of about 125,000 g/mol and a glass transition temperature of about 206° C. was used. The copolymer included about 49 wt % of a component derived from N-phenyl maleimide, about 2 wt % of a component derived from maleic anhydride, and about 49% of a component derived from styrene.

Experimental Examples

The results of the following experiments are shown in Table 2.

(1) Coloring Properties (%): transmittance of specimens having a thickness of 3.2 mm and a size of 100 mm×100 mm was measured by using an NDH-7000 equipment made by GNB Tech. Higher transmittance means more transparency, which verifies excellent coloring properties.

(2) Impact Resistance (kgf·cm/cm): Notched Izod Impact strength of ¼"-thick specimens was measured according to ASTM D256.

(3) Heat Resistance (° C.): A Vicat Softening temperature (VST) was measured according to ASTM D1525.

TABLE 2

|  | Examples | | | | | Comparative Examples | | | | | | | |
| --- | --- | --- | --- | --- | --- | --- | --- | --- | --- | --- | --- | --- | --- |
|  | 1 | 2 | 3 | 4 | 5 | 1 | 2 | 3 | 4 | 5 | 6 | 7 | 8 |
| Transmittance | 45.03 | 43.42 | 41.86 | 40.29 | 39.36 | 58.17 | 46.12 | 35.18 | 27.83 | 21.85 | 52.62 | 38.02 | 33.21 |
| Izod Impact strength | 7.1 | 7.1 | 7.2 | 7.5 | 7.3 | 7.3 | 7.4 | 6.9 | 6.7 | 6.3 | 7.5 | 7.0 | 6.8 |
| VST | 99.0 | 99.1 | 99.7 | 100.2 | 100.5 | 96.8 | 98.0 | 100.4 | 101.6 | 103.7 | 97.7 | 101.0 | 101.8 |

Referring to Tables 1 and 2, the thermoplastic resin compositions according to the example embodiments of the present invention exhibited Izod Impact strength of greater than or equal to 7 kgf·cm/cm and simultaneously, satisfied VST of greater than or equal to 99° C. and transmittance of greater than or equal to 40%. Accordingly, (A) the (meth)acrylic resin, (B) the acrylic graft copolymer, and (C) the maleimide-based heat-resistant copolymer may be used in optimal amounts to secure excellent transmittance and thus realize thermoplastic resin compositions having improved coloring properties, impact resistance, and heat resistance.

Hereinbefore, the certain exemplary embodiments of the present invention have been described and illustrated, however, it is apparent to a person with ordinary skill in the art that the present invention is not limited to the exemplary embodiment as described, and may be variously modified and transformed without departing from the spirit and scope of the present invention. Accordingly, the modified or transformed exemplary embodiments as such may not be understood separately from the technical ideas and aspects of the present invention, and the modified exemplary embodiments are within the scope of the claims of the present invention.

The invention claimed is:

1. A thermoplastic resin composition, comprising:
(A) 60 to 85 wt % of a (meth)acrylic resin;
(B) 10 to 30 wt % of an acrylic graft copolymer; and
(C) 5 to 9 wt % of a maleimide-based heat-resistant copolymer, wherein the maleimide-based heat-resistant copolymer (C) is a terpolymer comprising 15 to 25 wt % of a component derived from N-phenyl maleimide, 65 to 75 wt % of a component derived from styrene and 5 to 10 wt % of a component derived from maleic anhydride, each based on a total weight of the maleimide-based heat-resistant copolymer (C).

2. The thermoplastic resin composition of claim 1, wherein the (meth)acrylic resin (A) has a glass transition temperature (Tg) of greater than or equal to 110° C.

3. The thermoplastic resin composition of claim 1, wherein the (meth)acrylic resin (A) has a weight average molecular weight of 50,000 to 300,000 g/mol.

4. The thermoplastic resin composition of claim 1, wherein the (meth)acrylic resin (A) is a polymer of (meth)acrylate monomers comprising a C1 to C10 alkyl group.

5. The thermoplastic resin composition of claim 1, wherein the (meth)acrylic resin (A) is poly(methyl methacrylate) (PMMA).

6. The thermoplastic resin composition of claim 1, wherein the acrylic graft copolymer (B) comprises 40 to 65 wt % of an acrylic rubbery polymer based on a total weight of the acrylic graft copolymer (B).

7. The thermoplastic resin composition of claim 6, wherein the acrylic rubbery polymer is an alkyl acrylate-based rubber.

8. The thermoplastic resin composition of claim 1, wherein the acrylic graft copolymer (B) is an acrylonitrile-styrene-acrylate graft copolymer (g-ASA).

9. The thermoplastic resin composition of claim 1, wherein the maleimide-based heat-resistant copolymer (C) has a glass transition temperature of 150° C. to 220° C.

10. The thermoplastic resin composition of claim 1, wherein the maleimide-based heat-resistant copolymer (C) has a weight average molecular weight of 80,000 to 200,000 g/mol.

11. A molded product using the thermoplastic resin composition of claim 1.

12. The molded product of claim 11, wherein the molded product has a Vicat softening temperature of greater than or equal to 99° C.; a transmittance of greater than or equal to 40%; and an Izod impact strength of greater than or equal to 7 kgf·cm/cm.

13. The thermoplastic resin composition of claim 1, wherein the thermoplastic resin composition comprises (C) 5 to 8 wt % of the maleimide-based heat-resistant copolymer.

* * * * *